UNITED STATES PATENT OFFICE.

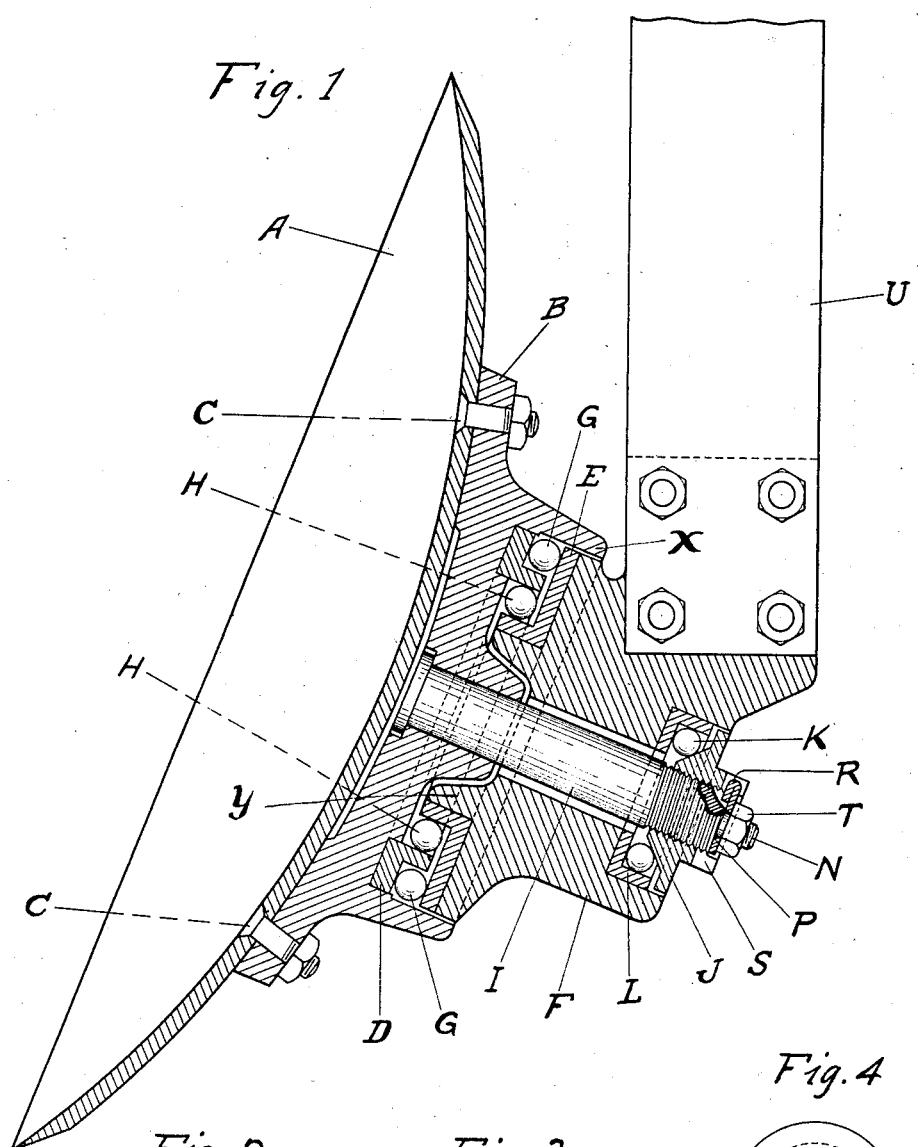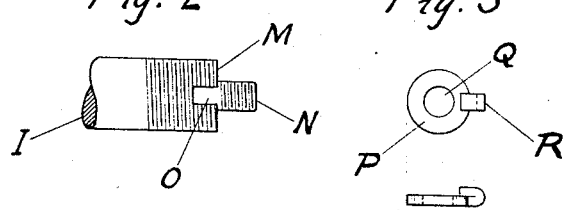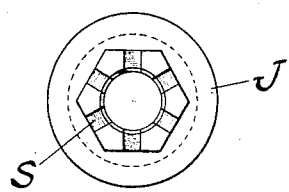

WALTER HAY, OF OMAHA, NEBRASKA, ASSIGNOR TO THOMAS F. STROUD, OF OMAHA, NEBRASKA.

ROTARY DISK PLOW.

No. 830,431.     Specification of Letters Patent.     Patented Sept. 4, 1906.

Application filed February 23, 1906. Serial No. 302,627.

*To all whom it may concern:*

Be it known that I, WALTER HAY, a citizen of the United States, residing at Omaha, in the county of Douglas and State of Nebraska, have invented certain new and useful Improvements in Rotary Disk Plows, of which the following is a specification.

The more prominent objects of my invention relate to the bearings and comprise a construction whereby friction and wear are reduced to a minimum and wherein the use of oil or other lubricant can be entirely dispensed with. In accomplishing this result ball-bearings are used entirely.

I am aware of the fact that some disk plows have heretofore been constructed with ball and roller bearings. However, their employment has invariably been unsatisfactory owing, primarily, to inadequate provision in their construction for the law of leverage and bearings best adapted thereto, and consequently to excessive friction and rapid wear and the resulting necessity for frequent applications of lubricating-oil, which, while affording temporary relief and preventing possible stoppage of rotation, serves to greatly increase the wear by causing sand or other gritty particles (sure to get to the bearings from the very nature of the device) to adhere to the oiled wearing-surfaces.

It has been demonstrated after much experimenting with ball-bearings subjected to considerable pressures that in order to obtain satisfactory results the balls must have two points of thrust-contact only and that in such a bearing no oil is required and there is no tendency to heat; also, that in bearings subjected to considerable pressures where one row of balls only is used for both end and lateral thrusts or where such double thrust eventually occurs through wear of some other bearing excessive friction results and unless plentifully supplied with lubricating-oil injury manifested by heating occurs.

One object in adopting ball-bearings as being superior to other forms of bearings for all thrusts in a device of this character arises from the fact that when sand or dirt gets on the bearing-surfaces the difficulty of rotation of ball or roller is proportionate to the extent of their bearing-contact—that is to say, a ball will almost invariably force particles out of its way while a roller cannot and, as a result, frequently becomes clogged, and a bearing devoid of balls or rollers rapidly wears to a state of uselessness.

Guided by the foregoing facts I have constructed a rotary disk plow having an extended bearing-surface to obviate undue leverage and wherein the principal thrusts are resisted by balls having a two-point thrust-contact and wherein no oil or other lubricant is to be used and wherein sand or dirt that enters to the bearings will find ready means of egress.

Referring to the accompanying drawings, Figure 1 represents a side sectional elevation of a rotary disk plow embodying my improvements, and Figs. 2, 3, and 4 details of construction hereinafter referred to.

A is a disk of the usual concavo-convex form securely fastened to the disk-seat B by means of a plurality of bolts C. Firmly held within the disk-seat and concentric therewith is the bearing-ring D, adjacent and concentric with the bearing-ring E, which is concentric with and firmly held by the bearing-base F. Each bearing-ring is constructed with an outwardly-projecting flange. That of ring D forms part of the ball-race for balls G G and also for balls H H. That of ring E forms part of the ball-race for balls H H only.

The stud-shaft I, concentric with the bearing-ring D, is force-fitted to the disk-seat B and projects at right angles therefrom and through the bearing-base F to receive on its threaded part the cone-nut or threaded cone-bearing J, which when adjusted to come in contact with the row of balls K, retained within the cup-shaped bearing L, held firmly by and concentric with the bearing-base F, serves to hold the disk-seat in its proper working position.

X is a flange on the disk-seat B, covering outwardly the ring D, balls G G, ring E, and projecting over the bearing-base F to form a dust-cap.

Y is a flange projecting outwardly from the bearing-base F and around which the ring E is closely seated.

It will be observed that the base of ring D is set into the disk-seat B, but projects outwardly therefrom, so that the distance between the bases of the ring E and the ring D is less than that between the base of the ring E and the disk-seat B. Hence when the stud-shaft I is drawn into position by the cone-nut J the external balls G G contact with D and E to sustain end thrust before the internal balls H H can contact with E and B. In like manner the space between the flanges of D and E is so proportioned that the balls H H bear the entire lateral thrust, while the space between the flange of D and the external flange X is greater than the diameter of the balls G G, so that the latter balls are free from lateral thrust. By constructing the rings without grooved ball-races each ball will have a two-point-thrust contact only.

The rear end of the stud-shaft I is reduced in size, as shown more clearly in Fig. 2, to form the square shoulder M and the threaded stud N. A short keyway O is made in the shoulder M.

Fig. 3 shows a key-washer, the body P having a centrally-located hole Q, which is slightly larger in diameter than the stud N, Fig. 2. The key R is formed from a narrow projecting part of the washer-body and is doubled by bending to produce the raised part shown.

Fig. 4 is a rear view of the cone-nut or threaded cone-bearing J, which is constructed with a hexagonal projection having a slot or keyway S through each of the six sides.

From the foregoing and by reference to the drawings it is obvious that when the cone-nut or threaded cone-bearing J is wrench-adjusted to its proper position on the stud-shaft I, Fig. 1, it will be positively retained or locked in such position by means of the key-washer P, which is held in place on the threaded stud N and next the shoulder M, Fig. 2, by the nut T, the key R of said key-washer entering one of the slots in the cone-nut or threaded cone-bearing J at the same time the raised part of the key enters the keyway in the shoulder of the stud-shaft I.

The plow can be connected to a plow-beam or another support by any suitable means—as, for example, a common standard U, bolt-fastened to the said bearing-base F.

It will be understood that the details of construction as here shown and described can be modified or changed, if desired, without departing from the spirit of my invention.

What I claim as my invention is—

1. In a rotary disk plow, in combination, a concavo-convex disk, the disk-seat B to which the said disk is fastened, the bearing-base F adapted to connect to a plow-beam standard or another support, the adjacently-positioned bearing-rings D and E forming between them two separate ball-races for a plurality of balls G and H in each ball-race, the stud-shaft I fast to and projecting centrally from the said disk-seat and through the said bearing-base and having its rear end threaded, the cone-nut or threaded cone-bearing J adjustably mounted on the said stud-shaft, the cup-shaped bearing L secured within the said bearing-base, said cone-nut and cup-shaped bearing forming between them a ball-race for a plurality of balls K, and means for preventing the said cone-nut from moving on the stud-shaft I.

2. In a rotary disk plow, in combination, a concavo-convex disk, the disk-seat B, the bearing-base F adapted to connect to a plow-beam standard or another support, the bearing-rings D and E forming separate ball-races, a plurality of balls G and H therein, the stud-shaft I fast to the disk-seat B and projecting through the bearing-base F and having the rear end of its major part threaded and constructed with the keyway O and the reduced part forming the shoulder M and the threaded stud N, the cone-nut or threaded cone-bearing J constructed with one or more keyways or slots S and adapted to screw adjustment on the stud-shaft I, the cup-shaped bearing L secured within the bearing-base F, a ball-race having a plurality of balls K and the key-washer P formed with the projecting and raised key R, said key-washer being secured to the stud-shaft I by means of the threaded stud N and nut T and adapted to lock the cone-nut or threaded cone-bearing J to the stud-shaft I, substantially as described.

WALTER HAY.

Witnesses:
 HARRY E. ROGERS,
 CHAS. FLECK.